Aug. 11, 1936.　　　F. H. GULLIKSEN　　　2,050,316
CUTTER REGISTER CONTROL
Filed March 16, 1934　　　2 Sheets-Sheet 2
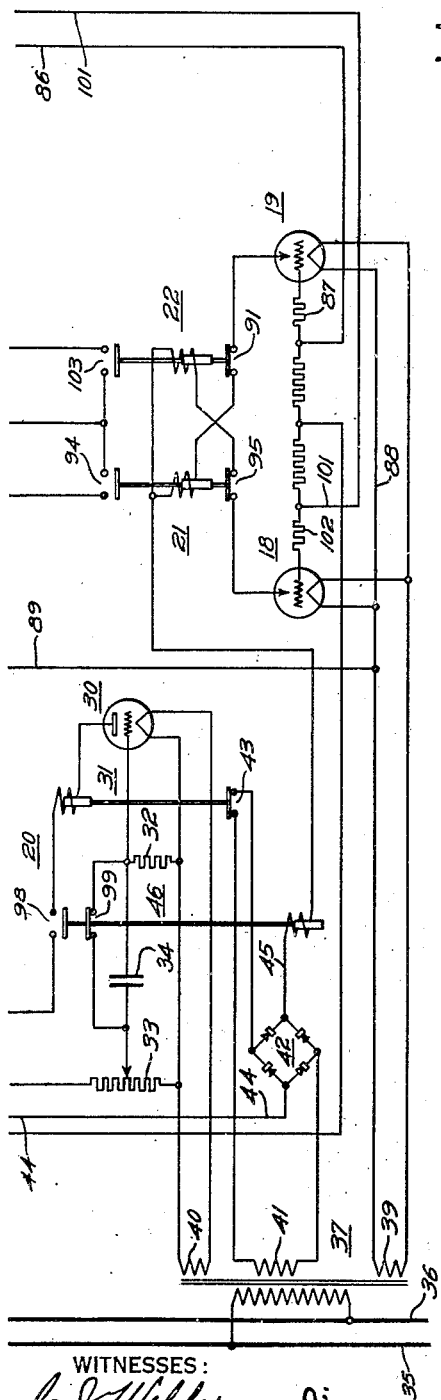
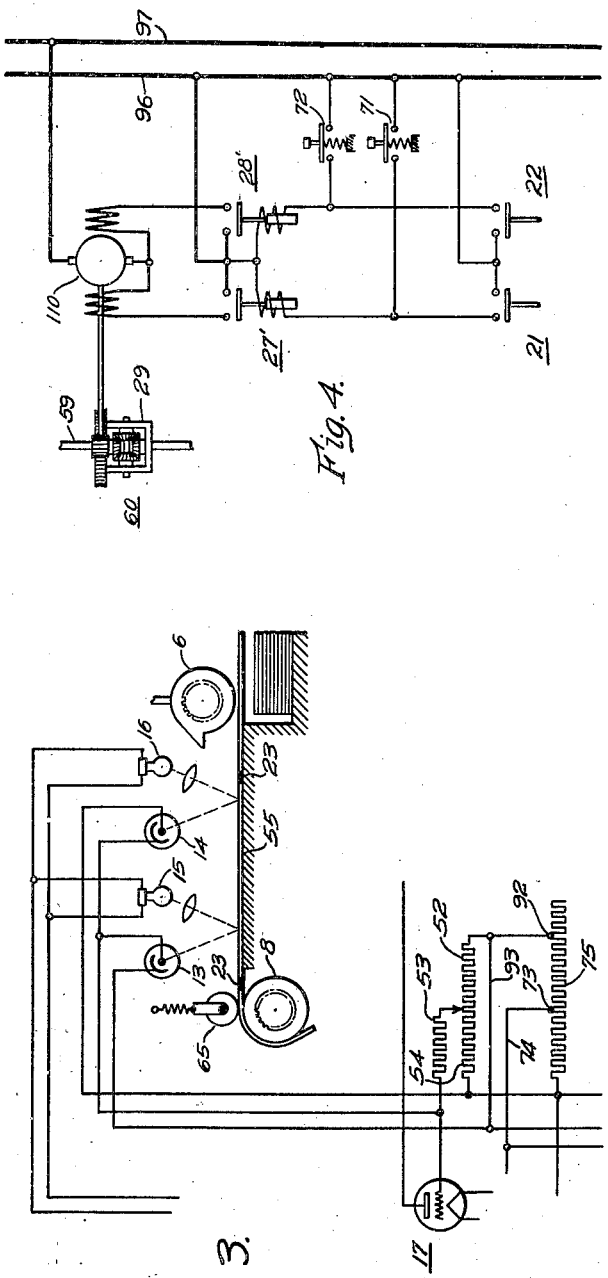
WITNESSES:
INVENTOR
Finn H. Gulliksen
BY
ATTORNEY Patented Aug. 11, 1936

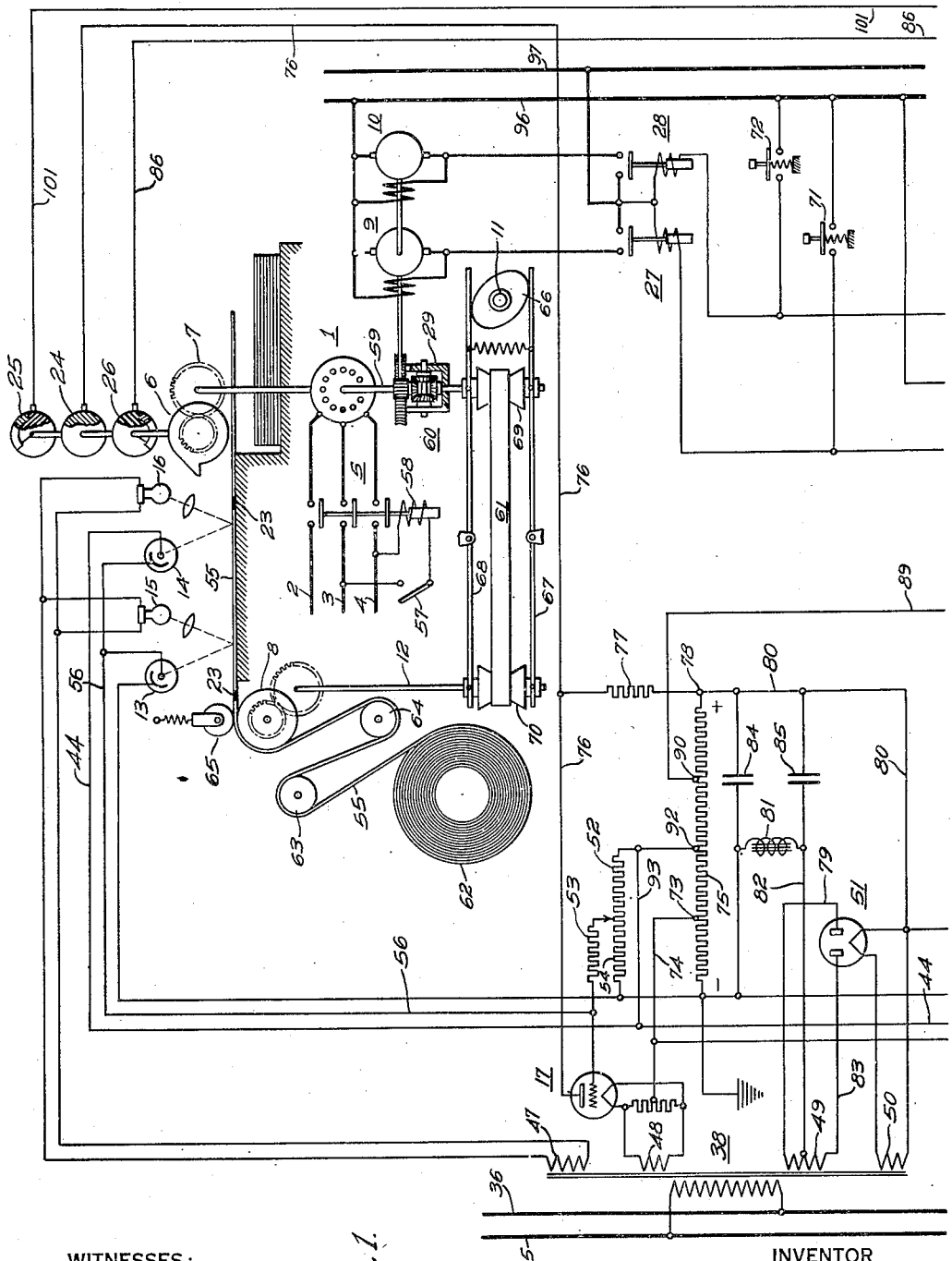

2,050,316

UNITED STATES PATENT OFFICE 2,050,316

CUTTER REGISTER CONTROL

Finn H. Gulliksen, Wilkinsburg, Pa., assignor to Westinghouse Electric & Manufacturing Company, East Pittsburgh, Pa., a corporation of Pennsylvania Application March 16, 1934, Serial No. 715,874

43 Claims. (Cl. 164—68)

This invention relates to electrical control systems for apparatus operating on material.

This invention is a continuation in part of applicant's case Serial No. 590,267 filed February 1, 1932 relating to Photo-electric paper cutting control.

More specifically, this invention relates to electrical control systems, involving thermionic means and light-sensitive means for controlling the relative positions and relative speeds of certain parts of a machine operating on a web of material.

In the art of paper cutting, winding, printing, or other manufacturing processes, such as the making of bags, the operation on the paper or web of material, when moving from a supply reel past certain rolls to the cutter, or to other parts of the machine, nearly always involves slippage, whereby the paper becomes shifted relative to the cutter or other machine element. Even when there be no slippage, the hygroscopic characteristics of paper, or temperature, or both, will cause a change in its dimensions, and also its surface characteristics, with changes of relative humidity and/or changes in temperature, with the result that certain machine elements will not register with the paper in the desired manner. Slippage and the moisture effect may, of course, occur simultaneously.

One object of my invention is to provide for properly registering certain regions of a material being operated upon by a machine with certain elements of the machine.

It is another object of this invention to control the operation of apparatus operating on a web so that the required operation on the web will take place at the right point, regardless of slippage of the web, or changes of dimensions or the surface characteristics thereof.

Another object of this invention is to control the relative speeds of a cutter and the feeding means of a machine, operating on a web, by means of photo-electric control means.

A further object of this invention is to control the position of the web, in a machine operating on a web, by photo-electric control means.

Another object of this invention is to control the relative speeds of certain parts of a machine operating on a web and the relative positions of these parts by the cooperative action of photo-electric and thermionic means.

A broad object of my invention is to provide photo-electric control means, unaffected by changes in color of the material being operated upon by a machine or by changes in appearance or by changes in the character or the condition of the material, to control the machine so that certain elements of the machine are caused to register with the indicia which may be either on or in the material.

A still further broad object of my invention is to provide a compensating control system, including photo-electric means for compensating for changes in the color and depth of color of the web, shade of the web, and the character, shade and color of the indicia which may be either on or in the web, to register certain elements of a machine operating on a web with selected regions of the web.

Other objects and advantages of my invention will become apparent from a study of the following specification, when considered in conjunction with the accompanying drawings, in which:

Figs. 1 and 2 constitute a diagrammatic showing of the cutter, web feeding device, driving means therefor and control system for controlling the operation of the equipment constituting applicant's invention.

Fig. 3 is a modified diagrammatic showing of the photo-electric scanner employed in my invention; and Fig. 4 shows, diagrammatically, how a single reversible motor may be utilized to operate the localizer or speed varying means illustrated in Fig. 1.

Referring more particularly to Fig. 1 of the drawings, an electric motor 1, preferably an induction motor, is supplied with electrical energy from buses 2, 3 and 4 through line contactor 5. A cutter 6 is coupled to the motor 1 through a reduction gear 7. The motor 1 is also utilized to drive the web-feeding mechanism or roll 8, the operation of the web-feeding mechanism taking place through a mechanical differential or localizer and speed changer, both of which may be adjusted by a pair of motors 9 and 10, and a hand wheel 11, respectively. The web feeding mechanism 8 is coupled to a shaft 12 through suitable reduction gearing.

Associated with the apparatus for operating on the web are light-sensitive or radiation responsive means 13 and 14 and sources of light 15 and 16 for these respective light-sensitive means.

Some of the control equipment appears in Fig. 1, but the main part of the control equipment is shown in Fig. 2. The control equipment includes an amplifier tube 17, a pair of hot cathode tubes 18 and 19, a time-limit circuit arrangement 20 and a pair of directional contactors or relays 21 and 22.

The theory of operation of the scheme, generally stated, embodies the synchronizing of a spot 23, either printed on the paper or appearing as a water mark in the paper, with the operation of some contact segments 24, 25 and 26 designed to rotate with the cutter. This synchronization thus provides that the cutter will cut the web of material when the spot, either on or in the material, has a definite relation with reference to the cutter. When the spot is synchronized, the brushes on the contact members do not engage the contact segments thereof when the photo-cell impulse from the photo-cell 13 is obtained. If however, the spot 23 is not in proper position with reference to the cutter 6, the impulse given to the photo-cell 13 by the decrease of current flowing therein modifies the operation of amplifier tube 17, and this modified operation, because of the fact that the contact segments coupled to the cutter are not in synchronism with the spot on the paper or web, causes the hot cathode tube 18 or 19, as the case may be, to break down, thereby operating either relay 21 or relay 22. When one of these relays has operated, one of the contactors 27 or 28 may be operated to establish a circuit for the motors 9 or 10 (see Fig. 1).

Operation of the motor 9 causes a shift in the position of the cutter 6 and the feeding roll 8 in one direction, whereas the operation of motor 10 causes a shift in the other direction, and operation of the hand wheel 11 causes a selected change in the speed difference between the cutter 6 and the web feeding roll 8. Since, as broadly indicated, either motor 9 or motor 10 is caused to operate, the change in speed relation between the cutter and the web feeding mechanism is to make the correction necessary to synchronize the spot on the web and the knife of the cutter. The operation of motor 9 operating on housing 29 of the differential mechanism shown causes a shift in the position between the cutter and the web feeding roll 8 in such a direction as to correct for the amount of asynchronous operation between the cutter blade and the spot on or in the web. After the motors 9 or 10, as the case may be, have operated for a short interval of time, the correction necessary may have been completed and no further synchronizing operation is necessary.

An important factor in any cutter control application is the mechanical arrangement of the feeding roll, speed-changing device, and the localizer equipment. In some cutting applications, the slip of the paper is relatively small or substantially zero, or practically constant, so that when the speed ratio between the cutter and the feed roll is adjusted by the hand wheel 11, the entire control can be obtained by means of the automatic adjustment of the localizer or differential mechanism.

The above-mentioned short interval of operation of the motors 9 or 10 is provided by a time-limited device, or time-limit circuit arrangement 20, which circuit arrangement includes the discharge device 30, the contactor 31, the associated capacitor discharge circuit which includes the resistor 32, a portion of resistor 33, and capacitor 34.

A better understanding of the invention may be had from a study of the sequence of operation involving a typical synchronizing operation for the embodiment of my invention disclosed in Figs. 1 and 2. In the specific embodiment herein disclosed, reference characters 35 and 36 designate the bus bars of a 60-cycle single-phase 110-volt circuit. It is to be understood, however, that the specific frequencies or voltages mentioned are not part of this invention and relate merely to one application of my invention.

If bus bars 35 and 36 are assumed to be suitably energized, a number of energized circuits are thereby established because the two transformers 37 and 38 are energized. Transformer 37 has a secondary winding 39 connected to energize the filaments or cathodes of hot cathode electric discharge devices 18 and 19. A second secondary winding 40 of transformer 37 energizes the filament of thermionic device 30 of the time-limit circuit arrangement 20.

The transformer 37 has a third secondary winding 41 for energizing the double-wave rectifier 42 through the back contact members 43 of contactor 31. Conductors 44 and 45 are connected to the direct-current junctions of the rectifier 42. Conductor 44 is connected to the cathode of photo-electric device 14, whereas conductor 45 is connected to the anodes of hot cathode tubes 18 and 19 through the actuating coil of relay 46 and the actuating coils of relays 21 and 22.

Transformer 38 has a plurality of secondaries 47, 48, 49 and 50. Secondary winding 47 energizes lights 15 and 16 continuously; secondary 48 energizes the filament of the amplifier tube 17; secondary 49 energizes the two anode terminals of rectifier 51; and secondary 50 energizes the cathode of the rectifier 51.

To provide for the requisite sensitivity of the photo-electric means or photo-cells 13 and 14 the bias-adjusting potentiometer, including the resistors 52, 53, and 54, is provided. The photo-cell 13 is so positioned with reference to the source of light that light coming from the source 15 is reflected from the material 55 onto the sensitive element of the photo-cell. The resistance value of the resistor 53 as well as the resistors 52 and 54, is so chosen as to increase the sensitivity of the photo-cell 13, so that a slight variation in the amount of light reflected from the web 55 will materially decrease the current flowing in the photo-cell circuit. Any change in the amount of current flowing in the photo-cell 13 will, by means of the conductor 56 connected to the cathode of photo-cell 13, decrease the negative bias on the grid of amplifier tube 17 and thus materially increase the current flowing through tube 17.

It should be noted that the anode of the photo-cell 14 is also connected to conductor 56 and thus to the grid of the amplifier tube 17. Furthermore, the cathode of photo-cell 14 is connected directly to one end of the potentiometer resistors 52 and 54, connected in series, and that the anode of the photo-cell 13 is connected to the other end of the potentiometer resistors 52 and 54.

The photo-cell 13, as above pointed out, will cause an increase of current in tube 17 when there is a decrease of current in the photo-cell circuit, but this same photo-cell 13 when there is an increase of current in its circuit, will cause a decrease of current in the tube 17. Since the photo-cell 14 is inter-connected with the tube 17 in an opposite sense to the inter-connection of photo-cell 13, an increase of current in photo-cell 14 will cause an increase of current in tube 17, whereas a decrease of current in photo-cell 14 will cause a decrease of current in the tube 17. Automatic compensation is thus provided for variations in the shade of the web, the color and depth of the color of the web, the finish of the web, variations in the voltage of the alternating current supplied, and variations in the color, depth of color, shade, finish, and character of the indicia used.

With the devices heretofore in use, utilizing but one photo-cell, a decrease in alternating current voltage will decrease the illumination and the effect is the same as if a spot on the paper or web intercepted or varied the light falling on the photo-cell. By using two photo-cells in a balanced circuit, as explained, the illumination on each photo-cell will be varied the same amount, and the photo-cell circuits will still remain balanced so that the output of tube 17 remains practically constant even though the color, shade, finish, or other characteristics of the material changes, and even though the voltage of the supply changes.

Ordinarily, the scanners are positioned relative to each other so that they do not scan the same region at the same time. The preferable positioning is such that neither scanner scans the printed material on the web but they are so positioned that the scanning takes place at the margin of the material along different lines or regions. Variations in color, depth of color, shade, finish, or, generally, appearance, etc., thus affect both scanners equally and in consequence, the current passing through tube 17 is not varied, except, of course, when the indicia 23 are brought in cooperative relation to the photo tube, or photo-cell 13.

While two photo-cells are used in a balanced circuit, only one, namely 13, is used to control the motors 9 and 10. This will become more apparent hereinafter.

For the complete operation of my system of control, it must, of course, be assumed that the switch 57 has been closed to energize the actuating coil 58 of the line contactor 5, thereby energizing the motor 1 from the conductors 2, 3, and 4. Operation of the motor 1 drives the cutter 6 and the contact members or segments 24, 25 and 26 through the reduction gear 7 and this motor also drives the web feeding roll 8 through shaft 59, the differential or localizer 60, the speed-changing device 61 and shaft 12 to the feeding roll 8 by means of the reduction gearing shown. The material 55 is fed from a supply reel 62 and passes over the idling and tension-adjusting rollers 63 and 64 of the feeding roll 8 with which it is made to engage by the spring actuated idler roll 65. As will be observed, any movement of the cam 66 will operate the spring biased levers 67 and 68 in such a direction that the cone-shaped two-part pulleys 69 and 70 will change the speed of the roll 8 relative to the speed of the cutter 6. The cam 66 is provided with a handwheel 11 for manually adjusting the relative speed of the roll 8 and cutter 6.

As long as the housing 29 remains fixed, the relative position of the feed roll remains fixed and, during operation, the relative speeds of the cutter and feeding device remain constant.

After threading the paper or other web material through the machine the paper may not be in proper position, that is, the line on which the paper is to be cut may not be at the desired position with reference to the cutter. To effect the proper positioning of the knife of the cutter with reference to the web, switches 71 or 72 may be closed to energize the one or the other of contactors 27 or 28, depending on what direction of rotation is desired for housing 29 by the operation of motors 9 or 10. For positioning the paper it is assumed that shaft 59 is stationary. Operation of the housing 29 thus rotates the roll 8 while the cutter remains stationary.

The web is provided with indicia consisting of marks which may be any color, finish, or shade and may even be merely normally invisible water marks in the paper. For the particular installation specifically herein disclosed, the mark or indicia need be a square mark of only five thirty-seconds of an inch on its edge.

With the manually controlled cutters heretofore known, an operation of the web of a hundred to at most a hundred and fifty feet per minute, could be secured, which further involved a wastage of material of from ten to fifteen percent. With my system of control, the operating speed can be from five hundred to a thousand feet per minute and the wastage is only about four percent. A further idea of the accuracy and reliability of my system of control may be gained when it is remembered that the indicia need only be a square of five thirty-seconds of an inch on edge. At a thousand feet per minute the light impulse will endure only for approximately one thousandth of one second, yet the cutting operation is carried on without errors.

The specific dimensions or nature of the indicia are, of course, not material to my invention. It is sufficient that some indicia be placed on the web or in the web at the points it is desired the web is to be cut or at some predetermined position with reference to the desired cut, so that the amount of light transmitted from the source of light to the photo-cells is periodically modified.

If the apparatus is in normal operation, and the adjustment of the web with reference to the cutter, as well as the speed of the cutter with reference to the web feeding device 8 has been properly effected, and assuming that, due to slippage or change in dimensions of the web or its surface characteristics by reason of its hygroscopic character, or due to changes in the temperature surrounding the web, the indicia 23 are not in the desired position with reference to the cutter, the contact segments 25 or 26 will be in such a position that the motors 9 or 10 may be caused to operate.

Each time the mark 23 passes under the source of light 15 so that the amount of light reflected back onto the photo-cell 13 is modified and such modification is not counteracted by the coaction of the web 55, the source of light 16 and photo-cell 14, the amount of current passing through the photo-cell is materially increased, and the grid voltage of the amplifier tube 17 is changed so that the current flowing from the plate to the cathode of the tube 17 is decreased. The current for the tube passes from junction 73 of resistor 75, through conductor 74, the cathode and plate of tube 17, conductor 76, and resistor 77 to junction 78 of resistor 75.

The rectifier 51 provides a substantially non-variable direct-current potential to the terminals of the resistor 75. For one portion of the alternating-current wave from the secondary 49, the current passes through conductor 79, rectifier 51, conductor 80 to junction 78, resistor 75, reactor 81, conductor 82 and secondary 49 to conductor 79. For the other half of the cycle or wave, the current comes from conductor 83 through the circuit just traced. The reactor 81 and capacitors 84 and 85 smooth out the ripples in the direct current.

If the cutter is in synchronism with the indicia on the web, the tube 13 merely has its current varied for each passage of the indicia under the source of light. If, however, the cutter is out of synchronism with the web, a circuit is established at the segments 24 and 25, or 24 and 26, depending upon whether the cutter lags behind or leads the paper. If the cutter cuts too fast or leads, a circuit is established from conductor 76, segments 24 and 26, conductor 86, resistor 87, the grid of hot cathode discharge tube 19, the cathode of the tube 19, and conductors 88 and 89 to the junction 90.

The closing of the circuit at segments 24 and 26 thus changes the bias on the grid of tube 19 so that this tube breaks down. The circuit for this tube may be traced from conductor 45 of the rectifier 42, through the actuating coil of relay 46, the actuating coil of the control directional contactor 21, the back contact members 91 of the control directional contactor 22, the principal electrodes of tube 19, conductors 88 and 89, to junction 90, a portion of resistor 75, junction 92 and conductors 93 and 44 to the rectifier 42.

Since the actuating coil of the contactor 21 is energized, this contactor operates to close contact members 94 and to open contact members 95. The closing of contact members 94 causes the operation of line contactor 27 for the motor 9. Motor 9 is thus connected to the energized buses 96 and 97 and operates in such a direction that housing 29 is shifted in such a direction that the speed of the web is increased. The increase of speed thus causes the cutter to again cut at the right region of the web.

In the absence of any provision to stop motor 9 there would be an over-correction. To prevent an over-correction, the time-limit circuit arrangement 20 is utilized. The break-down, or discharge action, of tube 19, heretofore explained, causes the operation of relay 46. The operation of relay 46 closes the contact members 98 and opens contact members 99 thereof. The opening of contact members 99 removes the shunt circuit for the capacitor 34 and, in consequence, the bias on the grid of tube 30 is changed. After a definite time interval, depending on the capacity of the capacitor and the resistance value of resistor 32, the tube 30 breaks down, thus energizing contactor 31. Operation of contactor 31 opens the contact members 43 thereof, thereby disconnecting the rectifier 42 from the secondary 41. Tube 19 and contactors 21 and 27 are thus deenergized and motor 9 thus stops.

If the correction was not sufficient because of one operation of motor 9, the cycle will automatically repeat itself, because the opening of contact members 43 deenergizes relay 46, whereby the capacitor is discharged and contact members 43 are reclosed.

If the cutter 6 operates too slowly, a circuit is established from conductor 76 through segments 24 and 25, conductor 101, resistor 102, grid and cathode of tube 18, and conductors 88 and 89 to junction 90. The circuit just traced will change the bias on the hot cathode discharge tube 18, which will thereupon break down, establishing a circuit from conductor 45 through the actuating coil of relay 46, actuating coil of contactor 22, back contact members 95 of contactor 21, the principal electrodes of tube 18, conductors 88 and 89 to the junction 90, a portion of the resistor 75, junction 92 and conductors 93 and 44 to the rectifier 42. Since the tube 18 carries current, contactor 22 is energized, closing the contact members 103 thereof, thereby energizing the line contactor 28 to connect the motor 10 to the buses 96 and 97. The motor 10 will thereupon operate the housing 29 in such a direction as to decrease the speed of the material 55 with reference to the cutter 6, so that the material will again be cut at the proper point by the cutter.

While the circuit arrangement for the photoelectric cells 13 and 14 is shown in one specific manner in Fig. 1, my invention is, however, not limited to the particular circuit arrangements shown. In Fig. 3 the same photo-cells 13 and 14 are inter-connected in an opposite sense so that a decrease of light on the photo-cell 13 causes a decrease of current in the photo-cell circuit, while a corresponding decrease of light on the photo-cell 14 causes a corresponding increase of current in the photo-cell 14. Any variations in the color, shade, finish or character of the paper will also not affect the control system shown in Fig. 3 but the indicia shown on the material will modify the bias on the grid of the tube 17, and in consequence, the motors operating on the housing 29 will be caused to operate in such a direction as to synchronize the cutter with reference to the indicia appearing on or in the material 55.

Certain devices of the prior art utilize mechanical detectors coacting with the web and a speed changing or localizing device. Such devices involve elements that have inertia and further require perforations in the web.

Both the photo-electric scanners or detectors shown in Figs. 1 and 3 respectively operate in response to variations in reflected light and thus constitute inertialess detectors.

My invention is not limited to a pair of motors 9 and 10 for operating the differential housing 29, but the speed correction may also be accomplished by the use of a single reversible motor 110 such as shown in Fig. 4. The contactors 27' and 28' are in this instance, not typical line contactors but a pair of reversing contactors for connecting the motor to the buses for one direction of operation or the other, depending upon which of the two hot cathode discharge tubes 18 or 19 may have been caused to break down.

The invention herein disclosed provides a marked improvement over devices heretofore known to the trade, and further, the invention is an improvement on, the invention disclosed in case Serial No. 590,267, filed February 1, 1932, relating to Photo-electric paper cutting control.

Although this invention includes a photo-electric control utilizing reflected light, transmitted light may also be used without departing from the scope of this invention.

It is well known that the sensitivity of an electric radiation responsive device, namely, the sensitivity of an "electric eye" does not correspond to the sensitivity of the human eye, so that variations in the texture smoothness, moisture content, color, etc of the material or the thickness of the material, which characteristics may be of such a nature that they cannot be detected by the human eye, will nevertheless, influence the "electric eye." Since these radiation responsive devices are very sensitive, it is obvious that it is doubly important to use a system of control that is not affected by variations in texture, thickness, smoothness, the humidity content of the material or for that matter, variations in the voltage of the electrical energy supplied to the various devices of the system of control. A variation in voltage is equivalent to a virtual change and not an actual change in the appearance of the material to the "electric eye."

Moreover, while the invention shown in the accompanying drawings and described in the foregoing specification has been disclosed in certain specific preferred embodiments thereof, it is readily appreciated that the circuit arrangement and the control equipment utilized therewith may be modified to still fall within the spirit and scope of this invention, by those skilled in the art, after having had the benefit of the teachings of my in-

I claim as my invention:

1. A web controller comprising, in combination with web-advancing means and a device to be operative on the web at predetermined intervals longitudinally thereto, a radiation responsive detector affected in its operation by variations of speed of the web relative to the speed of operation of the device and also influenced by radiations coming from the web that are not materially influenced by speed variations of the web, a second radiation responsive detector influenced only by radiations coming from the web that are not materially influenced by speed variations of the web, and means including a motor operative in forward and reverse direction under the control of the detectors for increasing or decreasing the speed of the web relative to the speed of operation of the device, whereby the operations of the device on the web take place at predetermined intervals longitudinally of the web independent of variations in the appearance of the web.

2. A web controller comprising, in combination with web-advancing means and a device to be operative on the web at predetermined intervals longitudinally thereof, a photoelectric detector means affected in its operation by variations of speed of the web relative to the speed of operation of the device and unaffected by the appearance of the web, and means including a motor operative in forward and reverse direction under the control of the detector means for increasing or decreasing the speed of the web relative to the speed of operation of the device, whereby the operations of the device on the web take place at predetermined points longitudinally of the web.

3. A web controller comprising, in combination with web-advancing means and a device to be operative on the web at predetermined points with reference to indicia carried by the web at predetermined intervals longitudinally thereof, a photoelectric detecting system scanning the web and designed to be unaffected by the appearance of the web but affected in its operation by variations of speed of the web relative to the speed of operation of the device, and means including a motor operative in forward and reverse direction under the control of the detector for increasing or decreasing the speed of the web relative to the speed of operation of the device, whereby the operations of the device on the web take place at predetermined intervals longitudinally of the web.

4. A web controller comprising, in combination with web-advancing means and a device to be operative on the web at predetermined intervals longitudinally thereof, a photo-electric detector affected in its operation by variations of speed of the web relative to the speed of operation of the device and responsive to the appearance of the web, a second photoelectric detector responsive to the appearance of the web and adapted to nullify the effect of the appearance of the web on the first-named detector, and means including a pair of motors operative respectively to increase or decrease the speed of the web relative to said device and responsive to the control of the first-named detector to increase or decrease, respectively, the speed of the web relative to the speed of operation of the device, whereby the operations of the device on the web take place at predetermined intervals longitudinally of the web.

5. A web controller comprising, in combination with web-advancing means and a device to be operative on the web at predetermined intervals longitudinally thereof, a photoelectric detector affected in its operation by variations of speed of the web relative to the speed of operation of the device and responsive to the appearance of the web, a second photoelectric detector responsive to the appearance of the web and disposed to nullify the effect of the appearance of the web on the first detector, and means including a pair of motors operative respectively to increase or decrease the speed of the web relative to said device and responsive to the control of the first-named detector to increase or decrease, respectively, the speed of the web relative to the speed of operation of the device, whereby the operations of the device on the web take place at predetermined intervals longitudinally of the web.

6. A web controller comprising, in combination with web-advancing means and a device to be operative on the web at predetermined points with reference to indicia carried by the web at predetermined intervals longitudinally thereof, a photoelectric detecting system scanning the web and thus being affected in its operation by variations of speed of the web relative to the speed of operation of the device and being affected by the appearance of the web, a second photoelectric detecting system, scanning the web and responsive to the appearance of the web, disposed to nullify the effect of the appearance of the web on the first-named system, and means including a pair of motors, operative respectively to increase or decrease the speed of the web relative to said device and responsive to the control of the first-named detector to increase or decrease, respectively, the speed of the web relative to the speed of operation of the device, whereby the operations of the device on the web take place at predetermined intervals longitudinally of the web.

7. A web-controller comprising, in combination with web-advancing means and a device to be operative on the web at intervals in its length during its advance, a radiation responsive detector responsive to variations in the speed of the web in relation to the speed of operation of said device and also responsive to the appearance of the web, a second radiation responsive detector, responsive to the appearance of the web, adapted to nullify the effect of the appearance of the web on the first radiation responsive detector, variable-speed driving means for the web advancing means, and a reversible motor controlled by the first-named detector and operative on the variable-speed driving means to compensate for variations in the speed of the web relative to the speed of operation of said device.

8. A web-controller comprising, in combination, with web-advancing means and a device to be operative on the web at intervals in its length during its advance, a photo-electric detector scanning the web and responsive to variations in the speed of the web in relation to the speed of operation of said device and responsive to the appearance of the web, a second photo-electric detector, scanning the web and responsive to the appearance of the web, disposed to nullify the effect of the appearance of the web on the first-named detector, variable-speed driving means for the web-advancing means, and a reversible motor controlled by the first-named detector and operative on the variable-speed driving means to compensate for variations in the speed of the web relative to the speed of operation of said device.

9. A web-controller comprising, in combination with web-advancing means and a device disposed to operate on the web at predetermined points with reference to indicia carried by the web at predetermined intervals longitudinally thereof, a photo-electric detecting system disposed to scan the web and indicia thereon and affected in its operation by variations in the speed of the web in relation to the speed of operation of said device and also affected by the appearance of the web, a second photoelectric detecting system, affected by the appearance of the web, disposed to nullify the effect of the appearance of the web on the first-named system, variable-speed driving means for the web-advancing means, and a reversible motor controlled by the first-named detector system and operative on the variable-speed driving means to compensate for variations in the speed of the web relative to the speed of operation of said device.

10. A web-controller comprising, in combination with web-advancing means and a device to be operative on the web at intervals in its length during its advance, a photoelectric detector responsive to variations in the speed of the web in relation to the speed of operation of said device and also affected by the appearance of the web, a second photoelectric detector affected by the appearance of the web and disposed to nullify the effect of the appearance of the web on the first-named detector, variable-speed driving means for the web-advancing means, and a pair of motors controlled by the first-named detector and both operative on the variable speed driving means to increase and decrease, respectively, the speed of the web relative to the speed of operation of said device.

11. A web-controller comprising, in combination with web-advancing means and a device to be operative on the web at intervals in its length during its advance, a photo-electric detector scanning the web and responsive to variations in the speed of the web in relation to the speed of operation of said device and also responsive to the appearance of the web to the detector, a similar second photoelectric detector responsive to the appearance of the web to this second detector, said second detector being disposed to nullify the effect of the appearance of the web on the first-named detector, variable-speed driving means for the web-advancing means, and a pair of motors controlled by the first-named detector and both operative on the variable speed driving means to increase and decrease, respectively, the speed of the web relative to the speed of operation of said device.

12. A web-controller comprising, in combination with web-advancing means and a device to be operative on the web at predetermined points with reference to indicia carried by the web at predetermined intervals longitudinally thereof, a photo-electric detecting system scanning the web and affected in its operation by variations in the speed of the web in relation to the speed of operation of said device and also affected by the appearance of the web to the system, a second similar photoelectric detecting system scanning the web and affected by the appearance only of the web to the system and disposed to nullify the effect of the appearance of the web on the first-named detecting system, variable-speed driving means for the web-advancing means, and a pair of motors controlled by the first-named detector and both operative on the variable speed driving means to increase and decrease, respectively, the speed of the web relative to the speed of operation of said device.

13. A web controller comprising, in combination with web-advancing means and a device to operate at intervals on the web during its travel, a radiation responsive detector responsive to variations in the speed of the web relative to the speed of operation of said device and responsive to the appearance of the web, a second radiation responsive detector adapted to nullify the effect of the appearance of the web on the first detector, variable-speed driving means for the web-advancing means and a reversible motor controlled by the first-named detector and operative in response to variations in speed of the web to alter the ratio of speed transmission through said driving means to thereby either accelerate or retard the speed of the web relative to the speed of operation of said device, depending upon the operation of said detector.

14. A web controller comprising, in combination with web-advancing means and a device to operate on the web at specified points with reference to certain indicia carried by the web, a photo-electric detector scanning the web and responsive to a change of position of said indicia with reference to the operation of said device and also affected by the appearance of the web, a second photoelectric detector scanning the web along a region not provided with indicia and thus responsive to the appearance of the web only, said second detector being connected to nullify the effect of the appearance of the web on the first-named detector, variable-speed driving means for the web-advancing means, and a reversible motor controlled by said photo-electric means to alter the ratio of speed transmission through said driving means to thereby either accelerate or retard the speed of the web relative to the speed of operation of said device, depending upon the operation of said first-named photoelectric detector.

15. A web controller comprising, in combination with web-advancing means and a device to operate at intervals on the web during its travel, a photo-electric detector responsive to variations in speed of the web relative to the speed of operation of said device and also affected by the appearance of the web, a second similar detector affected only by the appearance of the web and connected to nullify the effect of the appearance of the web on the first-named detector, variable-speed driving means for the web-advancing means, and a pair of motors operable on said web-advancing means and controlled respectively by said first-named detector to either accelerate or retard, respectively, the speed of the web relative to the speed of operation of said device.

16. A web controller comprising, in combination with web-advancing means and a device adapted to operate at intervals on the web during its travel, said web being provided with indicia at specified intervals longitudinally thereof, a pair of photo-electric detectors interconnected in a balanced circuit to scan said web and responsive only to the differential effect upon said photo-electric detectors, variable-speed driving means for the web-advancing means and a reversible motor controlled by the differential effect of said photo-electric detectors and operative in response to variations in speed of the web to alter the ratio of speed transmission through said driving means to accelerate or retard the speed of the web relative to the speed of operation of said device.

17. In a web-advancing means, in combination, a cutter, a web-advancing roller for advancing web material carrying indicia at specified points longitudinally thereof, a pair of photoelectric detectors scanning the web interconnected in a balanced circuit, an electric discharge device controlled by said photoelectric detectors and responsive only to the differential effect of said photo-electric detectors, a pair of motors and means responsive to the operation of said discharge device to control said motors, and a variable-speed driving means operated by said motors whereby the differential speed between said web advancing rolls and said cutter is varied.

18. In a system of control for a bag-making machine wherein a web of material bearing indicia passes through said machine and said machine is to effect certain operations on said web of material at specified points on the web, a photo-electric scanner responsive to a decrease of light reflected from said web, a second photoelectric scanner responsive to an increase of light reflected from said web, a discharge device responsive to the differential effect of said photoelectric scanners, and means controlled by said discharge device for controlling the relative speed of certain elements of said machine.

19. A controller for controlling the longitudinal movement of a web, in combination with web-advancing means and a device adapted to operate at intervals on the web during its travel, said web being provided with indicia at specified intervals longitudinally thereof, photo-electric detector means scanning the web and being responsive to the difference in characteristics of the light reflected from said indicia on said web and said web, variable-speed driving means for the web-advancing means, and a reversible motor controlled by said photo-electric detector means and operative to alter the ratio of transmission through said driving means to accelerate or retard the speed of the web relative to the speed of operation of said device.

20. In a system of control, in combination, a motor, a machine driven by the motor, said machine having an element adapted to take a plurality of positions during the operation of the machine, a second motor, a photo-electric scanner adapted to scan the surface of a material and responsive to the light emitting properties of the material along a given region, a second photoelectric scanner scanning the surface of the material along a different region than said first scanner, control means responsive to the differential effect of said scanners, and means responsive to said control means adapted to energize said second motor when the differential characteristics of the light reflected from said two regions of material differ from some normal characteristics at the time the said element of the machine is in a given position.

21. In a system of control for a motor, in combination, a machine having an element adapted to take different operating positions during operation of the machine, a motor, a source of energy, radiation reflecting surfaces, a pair of radiation responsive means adapted to be energized by the radiations reflected from two reflecting surfaces, and means adapted to connect said motor to said source of energy to energize said motor when the element of said machine is in a given position and the radiations falling on said two radiation responsive means from said surfaces differ by a predetermined amount.

22. In a system of control for a motor, in combination, a machine having an element adapted to take different positions during operation of the machine, a motor, a source of energy therefor, a radiation reflecting surface, a pair of photoelectric scanners disposed to scan said surface at two different points, an electric discharge device responsive to the differential effect of said scanners, and means adapted to connect said motor to said source of energy when the said element of said machine is in a given position and the differential effect of said scanners on the discharge device differs from some normal value.

23. In a system of control for a motor, in combination, a machine having an element adapted to take different positions during operation of the machine, a motor, a source of energy therefor, a radiation reflecting surface, a pair of photoelectric scanners disposed to scan said surface at two different points, an electric discharge device responsive to the differential effect of said scanners, and means adapted to connect said motor to said source of energy when the said element of said machine is in a given position and the differential effect of said scanners on the discharge device is below a given value.

24. In a system of control, in combination, a machine for operating on a web, said machine having an element adapted to take different positions during operation of the machine and adapted to operate on the web, a pair of radiation responsive means scanning the web at different points, an electric discharge device adapted to be energized by the scanners when their differential effect is less than a given value, a relay adapted to connect said motor to said source of energy, said relay being interconnected with said element and said discharge device to be energized only when the element is in a given position and the discharge device is energized.

25. Apparatus for maintaining the relative position of a strip of material fed to a machine having an element operating on the strip comprising, in combination, means for effecting a change in the relative positions of the strip and said element, means for effecting a change in the relative speeds of said strip and said element, an electric motor connected to actuate the means for effecting a change in the relative positions of the strip and the element, means for energizing said motor comprising electric valve apparatus provided with a control grid, and means, interconnected with said control grid, adapted to actuate said valve apparatus, said last-named means comprising a pair of radiation responsive devices, interconnected with said grid and thus with each other to produce substantially equal and opposite effects on said grid when subjected to substantially equal quantities of radiant energy, both of said radiation responsive devices being responsive to radiant energy coming from regions of the strip of material subjected to substantially equal radiant effect but one of said devices being so positioned to be also responsive to the speed of the material, whereby a departure of the strip of material from a proper relation with reference to said element causes the operation of said motor to thus reposition the material in proper relation to the element.

26. Apparatus for maintaining the relative position of a strip of material fed to a machine having an element operating on the strip comprising, in combination, means for effecting a change in the relative positions of the strip and said element, means for effecting a change in the relative speeds of said strip and said element, an electric motor connected to actuate the means for effecting a change in the relative positions of the strip and the element, means for energizing said motor comprising electric valve apparatus provided with a control grid, means, interconnected with said control grid, adapted to actuate said valve apparatus, said last-named means comprising a pair of radiation responsive devices, interconnected with said grid and thus with each other to produce substantially equal and opposite effects on said grid when subjected to substantially equal quantities of radiant energy, both of said radiation responsive devices being responsive to radiant energy coming from regions of the strip of material subjected to substantially equal radiant effect but one of said devices being so positioned to be also responsive to the speed of the material, whereby a departure of the strip of material from a proper relation with reference to said element causes the operation of said motor to thus reposition the material in proper relation to the element, and means for deenergizing said valve apparatus after a predetermined interval of time.

27. Apparatus for maintaining the relative position of a strip of material fed to a machine having an element operating on the strip comprising means for feeding said strip to said element, driving means for said feeding means, means for varying the relative speeds of said strip and said electric motor for actuating said position varying means, means for controlling the energization of said motor comprising electric valve apparatus provided with a control grid, and means responsive only to a departure of said strip from register with said element for actuating said valve apparatus, said means comprising a pair of radiation responsive devices interconnected with said grid and scanning said material at regions of substantially equal illumination but one of said devices being also responsive to the positional relation of the material with reference to said element, and a switching device included in the connections of said radiation responsive devices and said grid for preventing actuation of said valve apparatus when said strip and said element are in register.

28. Apparatus for maintaining the relative position of a strip of material fed to a machine having an element operating on said strip comprising, means for feeding said strip to said element, driving means for said feeding means, means for varying the relative speeds of said strip and element comprising a variable speed transmission between said driving means and said feeding means, means for varying the relative positions of said strip and said element, an electric motor for actuating said position varying means, means for controlling the energization of said motor comprising electric valve apparatus provided with a control grid, and means neither responsive to virtual nor real variations in appearance of the material but responsive only to a departure of said strip from register with said element for actuating said valve apparatus, said last-named means comprising a pair of radiation responsive devices interconnected with said control grid to produce opposite effects thereon and scanning said material at regions of substantially equal illuminations but one of said radiation responsive devices being so disposed to also scan indicia disposed on the material, amplifying means included in the connections between said radiation responsive devices and said control grid, and switching means included in the connection between the amplifying means and said control grid and driven by said element for preventing actuation of said valve apparatus when said strip and element are in register.

29. In a control system for apparatus operating on a web, in combination, a web cutter, a motor for driving the cutter, a web feeding mechanism, transmission mechanism, speed control means operating on said transmission mechanism for changing the speed relation between the cutter and the web feeding mechanism, position adjusting means for changing the relative position of certain parts of said feeding mechanism and cutter, and means responsive to a predetermined change in relationship between the cutter and the web to control the operation of said position changing means, said last-named means comprising a pair of photo-electric scanners scanning the web at regions subjected to substantially equal illumination, one of said scanners being responsive to indicia disposed on the web and the other scanner being so positioned as to be not responsive to the indicia placed upon the web, and means controlled by the differential effect of said scanners for controlling said position adjusting means.

30. In a control system for apparatus operating on a web having indicia thereon, in combination, a web cutter, a motor for driving the cutter, transmission devices, a web feeding mechanism driven by said motor, said transmission devices including a speed changer for changing the relative speed of the cutter and web feeding mechanism and a localizer for changing the relative position of the cutter and certain elements of the web feeding mechanism, illuminating means for the web and a pair of light-sensitive means operatively associated with said web and said illuminating means, and means responsive to the differential effect of said light-sensitive means for controlling the operation of said localizer when the indicia on the web has changed a predetermined amount with reference to said cutter.

31. In a control system for a web cutter, comprising, a cutter, a web feeding device, a motor for driving said cutter and feeding device, an automatically adjustable localizer for changing the relative position of the cutter and parts of the feeding device, a source of light and a pair of light-sensitive means operatively associated with the web, a motor for operating said localizer, control circuits for said motor, thermionic means for effecting the energization of the control circuits, said light-sensitive means being interconnected with each other and said thermionic means so that their differential effect controls the operation of said thermionic means to thus energize the motor operating the localizer when said web is not in proper position with reference to said cutter.

32. A control system for a device having an element operating on a strip of material and means for feeding the strip to said elements comprising means for varying the relative speed between said element and said feeding means, a mechanical differential device for effecting a change in the relative positions of the strip and said element, and radiation responsive means responsive only to variations of the position of said strip with reference to said element and unaffected by actual and virtual changes in appearance of the strip to said radiation responsive device for controlling the position of said mechanical differential device to reposition said strip with reference to said element when said web tends to move out of proper relation with reference to said element.

33. A control system for a machine having an element operating upon a strip of material and means for feeding the strip to said element comprising means for varying the speed relationship between said element and said feeding means, a mechanical differential device for effecting a change in the relative positions of the strip and said element, and self-compensating radiation responsive means compensating for variations in actual and virtual changes in appearance of the material to said radiation responsive device and therefore responsive only to indicia placed on said material, adapted to vary the position of said mechanical differential means to thus change the relative position of said material and said element, and a time limit device cooperating with said radiation responsive device for actuating said mechanical differential device for a predetermined interval of time.

34. A control system for a machine having an element operating on a strip of material provided with indicia and means for feeding the strip to said element comprising means for varying the speed relationship between the strip and said element, a mechanical differential device for effecting a change in the relative positions of the strip and said element, reversible electric motor means for actuating said mechanical differential device, and means comprising a pair of light-sensitive devices, one of which being disposed to scan the material and the other of which being disposed to scan the material and said indicia, and connected differentially whereby a change in their differential effect is produced at the moment one of said devices scans the indicia and the other the material only, and electromagnetic switching means controlled by said light-sensitive means at the moment their differential effect is varied for selectively effecting operation of said reversible motor means to thus change the operation of said mechanical differential device.

35. A control system for a machine having an element operating on a strip of material provided with indicia and means for feeding the strip to said element comprising means for varying the speed relationship between the strip and said element, a mechanical differential device for effecting a change in the relative positions of the strip and said element, reversible electric motor means for actuating said mechanical differential device, and means comprising a pair of light-sensitive devices, one of which being disposed to scan the material and the other of which being disposed to scan the material and said indicia, and connected differentially whereby a change in their differential effect is produced at the moment one of said devices scans the indicia and the other the material only, electromagnetic switching means controlled by said light-sensitive means at the moment their differential effect is varied for selectively effecting operation of said reversible motor means to thus change the operation of said mechanical differential device, and switching means operated by said web feeding means disposed in the circuit connections between said light-sensitive means and said electromagnetic switch means adapted to prevent the operation of said electromagnetic switching means when the indicia of the material has a desired relation with reference to said element.

36. A control system for a machine having a device for operating on a strip of material provided with indicia at specified points and a device for feeding the strip to said operating device comprising driving means and said devices, means for varying the speed relationship between the device operating on the strip and the device for feeding the strip, a mechanical differential device for also controlling the operating relation between said device operating on the device and the device for feeding the strip, means for varying the relative position of the strip with reference to said operating device comprising means for actuating said mechanical differential device, a pair of light-sensitive devices differentially connected, one of said devices being disposed to scan the material only and the other being disposed to scan the material and the indicia whereby their differential effect is changed when said light-sensitive devices scan the material and the indicia respectively, electric valve apparatus controlled by said light-sensitive devices adapted to control the operation of said mechanical differential device to thus control the position of said indicia with reference to said device operating on the strip of material.

37. A control system for a machine having a device for operating on a strip of material provided with indicia at specified points and a device for feeding the strip to said operating device comprising driving means for said devices, means for varying the speed relationship between the device operating on the strip and the device for feeding the strip, a mechanical differential device for also controlling the operating relation between said device operating on the strip and the device for feeding the strip, means for varying the relative position of the strip with reference to said operating device comprising means for actuating said mechanical differential device, a pair of light-sensitive devices differentially connected, one of said devices being disposed to scan the material only and the other being disposed to scan the material and the indicia whereby their differential effect is changed when said light-sensitive devices scan the material and the indicia respectively, electric valve apparatus controlled by said light-sensitive devices adapted to control the operation of said mechanical differential device to thus control the position of said indicia with reference to said device operating on the strip of material, and a time limit device for controlling the time of operation of said electric valve apparatus to thus control the interval of time during which said mechanical differential device is operated.

38. A control system for a device operating on a strip of material provided with indicia at specified points thereof and a device for feeding the strip of material to said operating device comprising driving means, driving connections including a variable speed transmission between said driving means and said devices, a mechanical differential disposed to also control the relative operation of said device for operating on the material and the device for feeding the material, and means responsive only to a departure of said indicia with reference to the element operating on the material for actuating said mechanical differential device to effect a space correction in the relative positions of the strip and said operating device when said indicia is not in proper relation to said operating device.

39. In a control system for a web cutter, comprising, a cutter, a web feeding device, a motor for driving said cutter and feeding device, an automatically adjustable localizer for changing the relative position of the cutter and parts of the feeding device, illuminating means for said web, a pair of light-sensitive means disposed to scan said web at the illuminated region, one of said light-sensitive devices being disposed to scan the web only and the other of said devices being disposed to scan the web at a region where the web is provided with indicia at predetermined intervals longitudinally thereof, a motor for operating the localizer, control circuits for said motor, thermionic means for effecting the energization of the control circuits, and means responsive to the differential effect of said light-sensitive means when scanning respectively the web and the indicia on the web for effecting the energization of said thermionic means when the cutter and web are not in the normal operating position whereby the localizer is operated to reestablish the normal operating position between the web and the cutter.

40. In a control system for a machine having an element operating upon a moving strip of material in predetermined relationship with respect to markings thereon, means for driving said strip and said element at predetermined speeds, a light-sensitive device arranged to be responsive to the passage of said markings and the material, a second light-sensitive device arranged to be responsive to the passage of the material only, a switching device cooperating with both of said light-sensitive devices to produce current impulses in response to variations of said strip from a predetermined relationship with respect to said elements, means responding to said impulses comprising an electric discharge device containing an ionizable medium and provided with an input circuit and an output circuit connected to a direct-current source so that said discharge device remains energized after the termination of an impulse, means for interrupting said output circuit to deenergize said discharge device after a predetermined interval of time, and means responsive to energization of said discharge device for reestablishing said predetermined relationship between said strip and said element.

41. In a control system for a machine having an element operating upon a moving strip of material provided with markings at predetermined intervals, means for operating said element and strip at predetermined speeds, an electric discharge device containing an ionizable medium, said device having an input circuit and an output circuit controlled thereby and energized from a direct-current source, means including a light-sensitive device disposed to respond to the markings on the material and the material and a second light-sensitive device disposed to respond to light coming from the material only, said light-sensitive devices being connected differentially and interconnected with said input circuit to thus transmit controlling impulses only when said two differentially connected light-sensitive devices have their controlling effect changed by simultaneous scanning of the material and the markings respectively, means including an electro-responsive device connected to said output circuit for varying the relative operating speeds of the element and the strip in response to said controlling operations to cause said element and said strip to operate in a predetermined relationship, and means including a device driven synchronously wth the element and preventing the transmission of said controlling impulses when the element and strip are operating in said predetermined relationship.

42. A control system for a machine having an element operating upon a strip of material provided with markings at predetermined intervals, means for operating said element and said strip at predetermined speeds, vapor-electric discharge apparatus having an input circuit and an output circuit energized from a direct-current source, means including a light-sensitive device disposed to scan the strip of material in line with the markings placed on the strip and therefore responsive to the appearance of the strip of material and the markings when positioned to be scanned by said light-sensitive device, a second light-sensitive device disposed to scan the material only and thus being responsive only to the appearance of the material, said light-sensitive devices being differentially connected to said input circuit for said vapor-electric discharge apparatus to thus transmit controlling impulses to said input circuit and to initiate a controlling operation in said output crcuit in response to variation of said element and said strip from a predetermined relationship, and means including an electro-responsive device for responding to said controlling operation to vary the relative speeds of the strip and the element to reestablish said predetermined relationship, and means including a switching device for interrupting said output circuit after a time interval to limit the time during whch said speed variation is effected.

43. A control system for a machine provided with an element for performing an operation upon a moving strip of material in predetermined relation with respect to markings thereon comprising means for driving said strip and said element at predetermined speeds, a control circuit, a light-sensitive device arranged to be responsive to the appearance of the material and the passage of said marking; on the material for producing electrical impulses in said circuit, a second light-sensitive device disposed to be responsive to the appearance of the material only and connected differentially with respect to the first light-sensitive device and said control circuit whereby the value of the impulses in said control circuit is determined by the differential effect of said light-sensitive devices, a pair of electric discharge devices adapted to be energized by said impulses, each of said discharge devices containing an ionizable medium and an input circuit and an output circuit connected to a direct-current source whereby it remains energized after the termination of an impulse, switching means operated synchronously with said element for selectively connecting the input circuits to said control circuit, thereby to energize one of said discharge devices in response to a departure of said strip and element from a predetermined relationship with respect to each other, a switching device for interrupting said output circuits to deenergize said discharge device after a predetermined time interval and motor means responsive to selective energization of said discharge devices and means actuated thereby for effecting corrections in the relationship of said strip to said element thereby to restore said strip and said element to a predetermined relationship.

FINN H. GULLIKSEN.